Oct. 30, 1962 J. S. SPIRA 3,061,744
ELECTRIC RECTIFYING POWER CONTROL AND LAMP DIMMING SYSTEM
Filed March 18, 1960 6 Sheets-Sheet 1
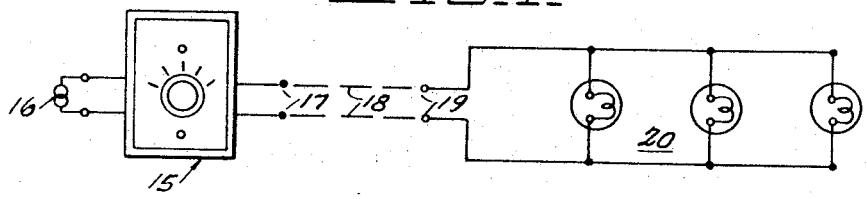
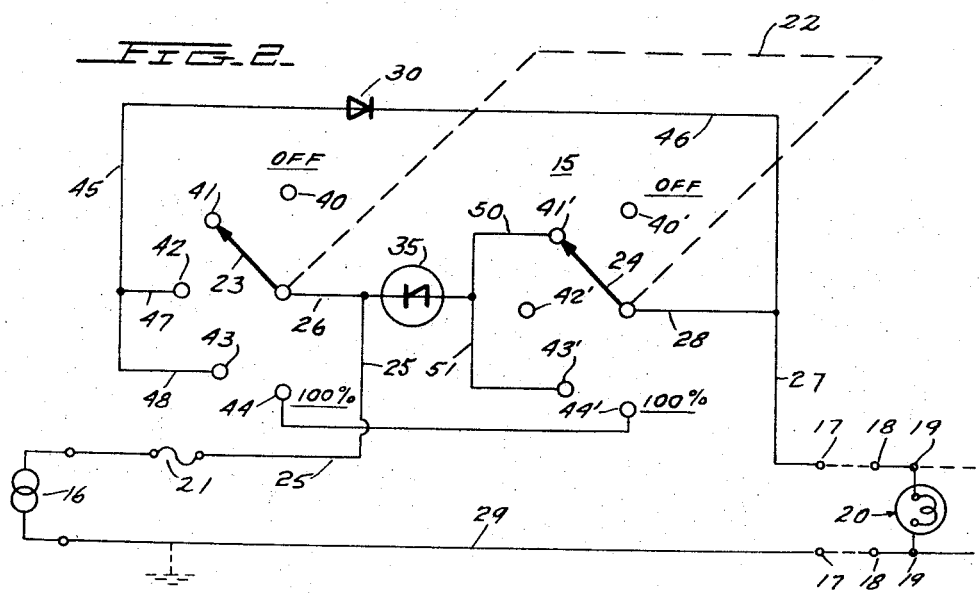
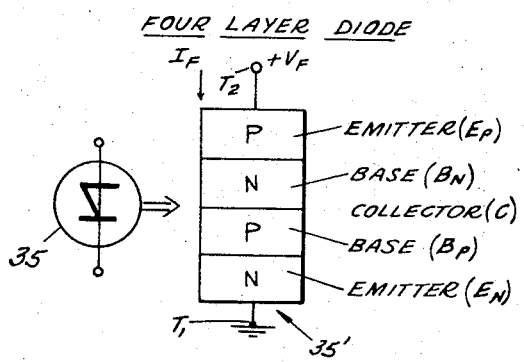
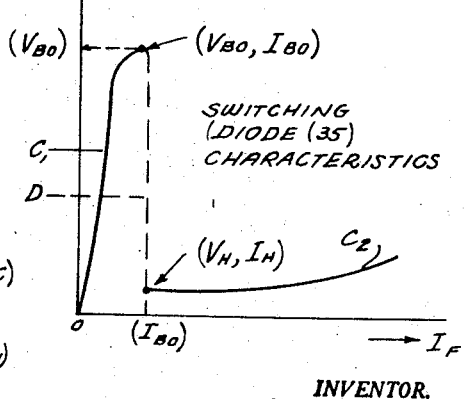
INVENTOR.
JOEL S. SPIRA
BY
OSTROLENK, FABER, GERB & SOFFEN
ATTORNEYS Oct. 30, 1962  J. S. SPIRA  3,061,744
ELECTRIC RECTIFYING POWER CONTROL AND LAMP DIMMING SYSTEM
Filed March 18, 1960  6 Sheets-Sheet 2
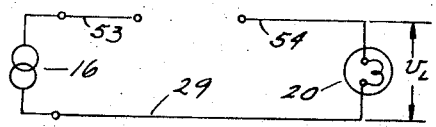
FIG. 5 — OFF STEP (40-40')
FIG. 6 — ZERO LUMENS
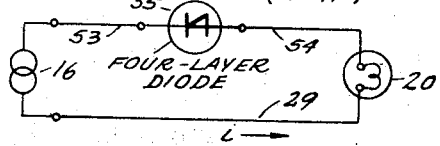
FIG. 7 — LOW STEP (41-41')
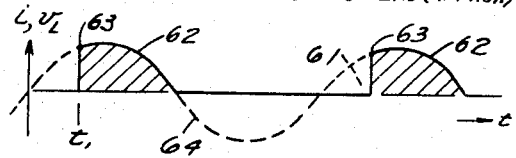
FIG. 8 — 15% LUMENS (APPROX)
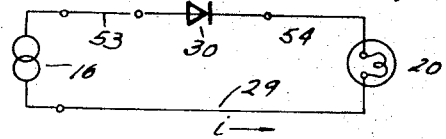
FIG. 9 — INTERMEDIATE STEP — (42-42')
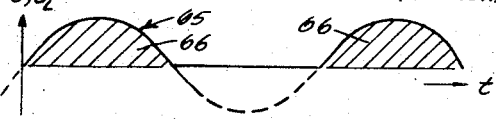
FIG. 10 — 30% LUMENS (APPROX)
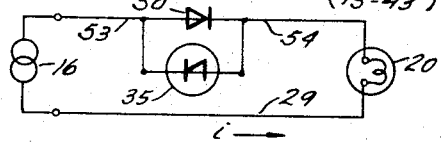
FIG. 11 — MEDIUM STEP (43-43')
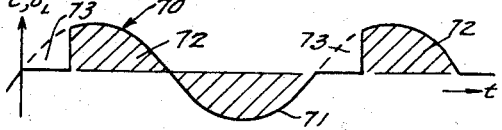
FIG. 12 — 75% LUMENS (APPROX)
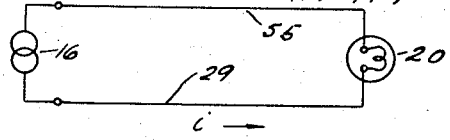
FIG. 13 — FULL STEP (44-44')
FIG. 14 — 100% LUMENS (APPROX)
INVENTOR.
JOEL S. SPIRA
BY
OSTROLENK, FABER, GERB & SOFFEN
ATTORNEYS Oct. 30, 1962 J. S. SPIRA 3,061,744
ELECTRIC RECTIFYING POWER CONTROL AND LAMP DIMMING SYSTEM
Filed March 18, 1960 6 Sheets-Sheet 3
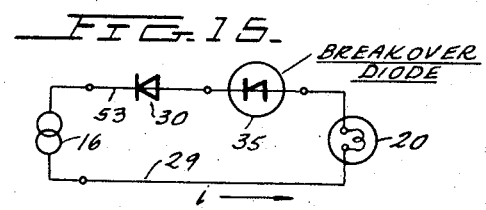
FIG. 15.
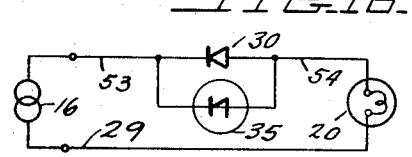
FIG. 16.
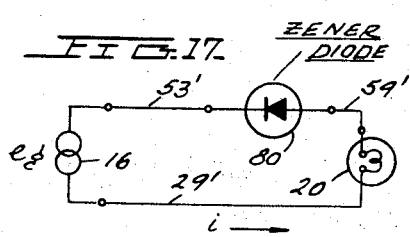
FIG. 17.
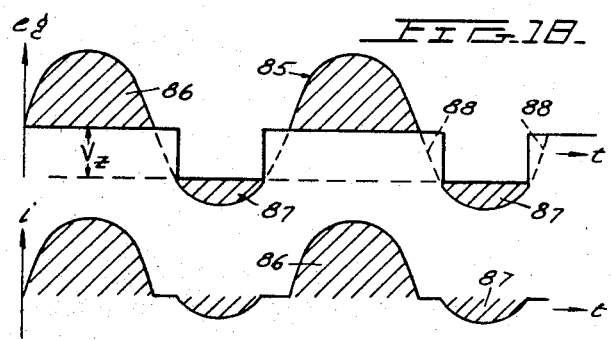
FIG. 18.
FIG. 19.
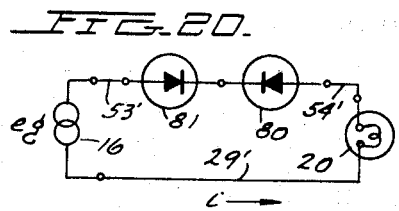
FIG. 20.
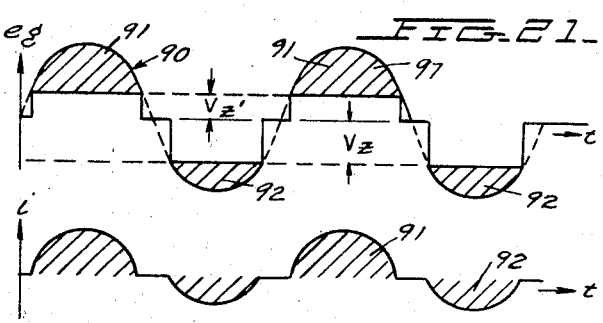
FIG. 21.
FIG. 22.
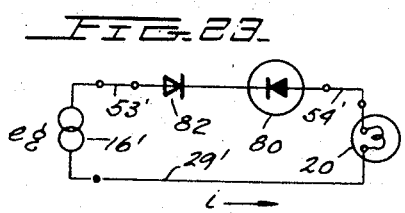
FIG. 23.
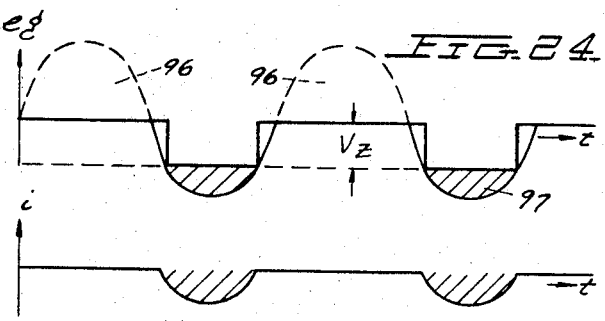
FIG. 24.
FIG. 25.
INVENTOR.
JOEL S. SPIRA
BY
OSTROLENK, FABER, GERB & SOFFEN
ATTORNEYS

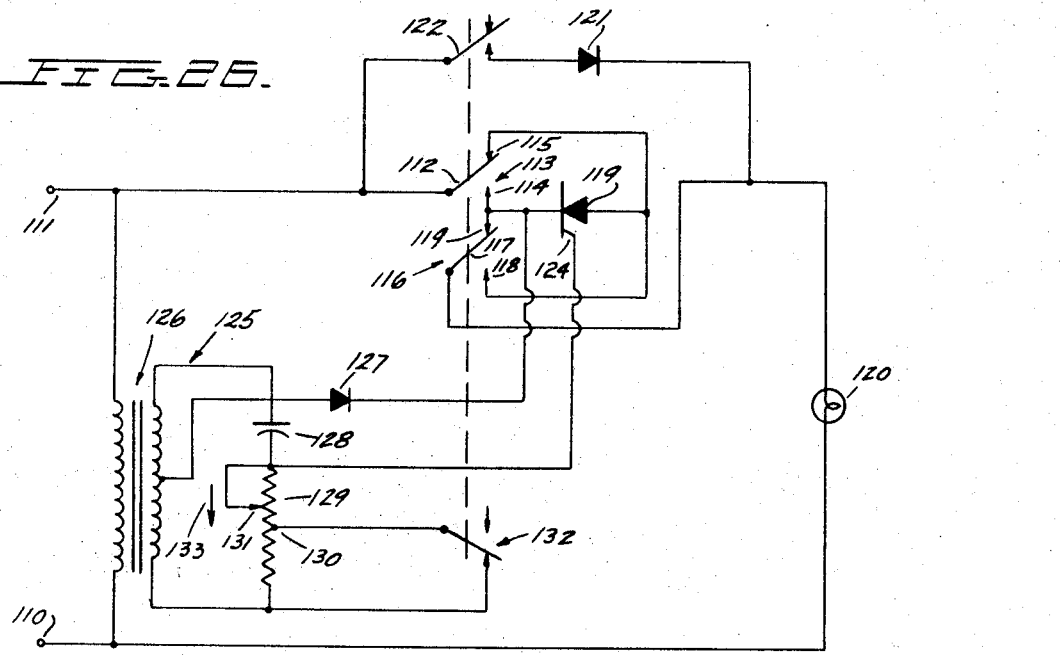
FIG. 26.
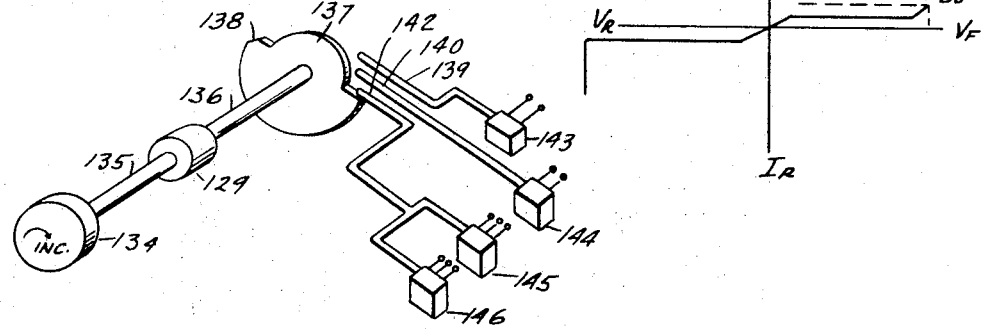
FIG. 27.
FIG. 28.
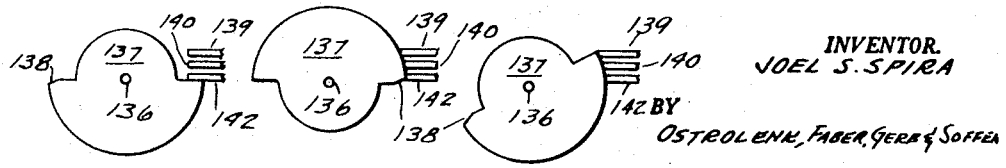
FIG. 29. FIG. 30. FIG. 31.
INVENTOR.
JOEL S. SPIRA
BY
OSTROLENK, FABER, GERB & SOFFEN
ATTORNEYS Oct. 30, 1962 J. S. SPIRA 3,061,744
ELECTRIC RECTIFYING POWER CONTROL AND LAMP DIMMING SYSTEM
Filed March 18, 1960 6 Sheets-Sheet 5

INVENTOR.
JOEL S. SPIRA
BY
OSTROLENK, FABER, GERB & SOFFEN
ATTORNEYS

Oct. 30, 1962  J. S. SPIRA  3,061,744
ELECTRIC RECTIFYING POWER CONTROL AND LAMP DIMMING SYSTEM
Filed March 18, 1960  6 Sheets-Sheet 6
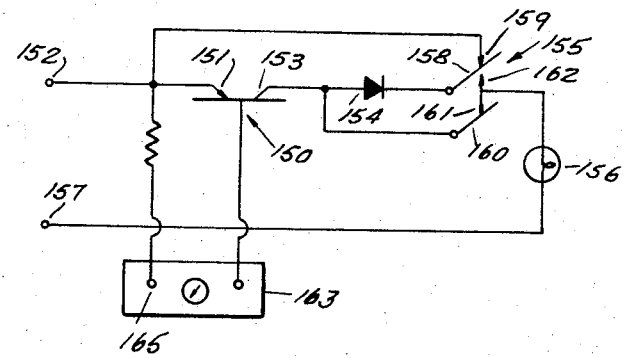
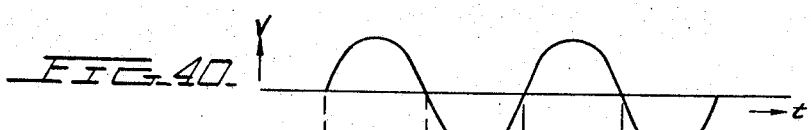
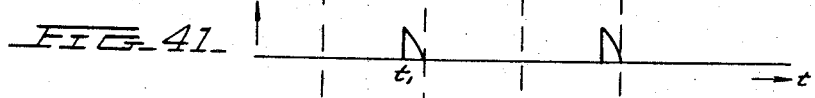
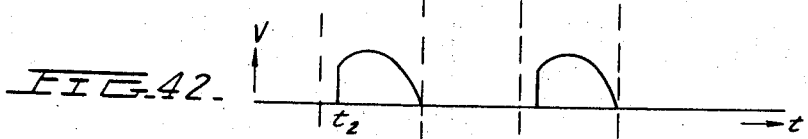
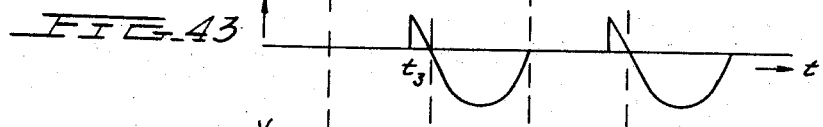
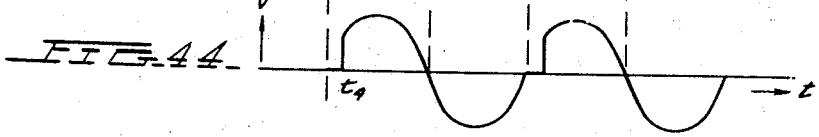
INVENTOR.
JOEL S. SPIRA
BY
OSTROLENK, FABER, GERB & SOFFEN
ATTORNEYS

United States Patent Office 3,061,744
Patented Oct. 30, 1962

3,061,744
ELECTRIC RECTIFYING POWER CONTROL AND LAMP DIMMING SYSTEM
Joel S. Spira, 180 Riverside Drive, New York, N.Y.
Filed Mar. 18, 1960, Ser. No. 15,949
14 Claims. (Cl. 307—146)

This invention relates to the combination of a switching means, a rectifier means, and a controllable means such as a thyratron or controlled rectifier or similar device which can absorb or block a controlled amount of input voltage for a selectively variable length of time, wherein the system is utilized in controlling the application of electrical power to a load.

The inventive system is applicable to many types of voltage regulation as, for example, in a system for selectively diming the lumen output of an electric lamp.

In the control system of the invention, a normal rectifier, which may be of the semi-conductor type, is selectively connected in various circuit relationships with a controllable element, whereby exerting a control over the controllable element will cause the combination to absorb or block more or less voltage to thereby control the voltage applied to a load from some external A.-C. source, where the system is interposed between the A.-C. source and the load.

In a first embodiment of the invention, the controllable means is comprised of a so-called four-layer diode or, in the alternative, it is composed of a Zener diode. The controllable element is then placed in various selective circuit arrangements with respect to the rectifier member where the combination is connected between an A.-C. source and a load so that in various switch positions the voltage of the positive half wave of the alternating current supply is completely passed or blocked by the rectifier, whereas the voltage of the negative half wave transferred to the load is controllably reduced by the controllable member such as a Zener diode or four-layer diode.

In a second embodiment of the invention, a continuous control from substantially zero power to substantially 100% power is achieved through the use of controllable members which lend themselves to continuous control, such as transistors, controlled rectifiers or thyratrons. Here again, the controllable member will operate on one-half cycle of the input power, while the rectifier will operate to either completely block or completely pass the other half cycle.

To achieve a zero power output, the rectifier completely blocks current flow for one-half cycle, while the controllable element completely blocks current flow for the other half cycle. To get a relatively small amount of power, the controllable element is controlled to pass a relatively small portion of the voltage of the half cycle upon which it operates. A further increase in power is then available by causing the controlled element to be completely conductive for its half cycle, while the rectifier continues to block during the opposite half cycle.

For a still further increase of power to the load, the switching means of the novel combination operates to reverse the direction of blocking of the rectifier and, if necessary, to bring the state of control of the controllable element back to its non-conductive state.

In this new switch position, the rectifier will pass the half cycle of power which it previously blocked and, as the condition of the controllable element is increasingly changed to increasingly permit more power to pass therethrough, the net power applied to the load can be increased to 100%.

In all of the novel embodiments of the present invention to be shown hereinafter, it will be apparent that the components readily lend themselves to economy of construction and are capable of being placed in a relatively small package so that the system could, for example, be connected in a home switch receptacle where it is to control the application of power to home lighting in the manner shown in my co-pending application Serial No. 827,232, filed July 15, 1959, now Patent No. 3,032,-688, and entitled "Dimming Device."

In addition to this, the system has relatively low losses so that the heating of the system is extremely low, and the system can readily meet any underwriter's fire requirements.

Accordingly, a primary object of this invention is to provide a novel electric power control system.

Another object of the invention is to provide a novel voltage regulating system which includes the combination of a switching means, a rectifier means, and a controllably conductive member.

A further object of this invention is to provide a novel economical combination of a switching means, a rectifier means, and a controllably conductive means which can control the flow of electrical current therethrough in a selective manner.

A still further object of this invention is to provide a novel combination of a switching means, a rectifier means and a controllable conductive means which can regulate power in a continuous manner between substantially zero power output to substantially 100% power output.

Another object of this invention is to provide a novel power regulating system which comprises the combination of a switching means, a rectifier means, and a controllable conductive means wherein the controllable conductive means and rectifier means are connectable in various predetermined circuit relationships with respect to one another by the switching means.

A further object of this invention is to provide a novel power regulating means which comprises the combination of a switching means, a rectifier means, and a four-layer diode.

A further object of this invention is to provide a novel power regulating means which comprises the combination of a switching means, a rectifier means, and a Zener diode.

A further object of this invention is to provide a novel power regulating means which comprises the combination of a switching means, a rectifier means, and a controlled rectifier means.

A further object of this invention is to provide a novel power regulating means which comprises the combination of a switching means, a rectifier means, and a transistor means.

A further object of this invention is to provide a novel power regulating means which comprises the combination of a switching means, a rectifier means, and any type of selectively conductive means.

A still further object of this invention is to provide a novel circuit control means which comprises the combination of a switching means, a rectifier means and a controllably conductive device which controls the passage of current therethrough in a selected manner during a predetermined half cycle of applied A.-C. voltage.

A further object of this invention is to provide a novel regulator device which includes a rectifier means which is connectable in the circuit for controlling conduction of current from an A.-C. source during a first half cycle of the A.-C. voltage and a controllably conductive device for controllably effecting current flow from the A.-C. source during the other half cycle of voltage of the A.-C. source.

These and other objects of this invention will become apparent from the following description when taken in connection with the drawings in which:

FIGURE 1 schematically shows a typical installation of the control system of the invention for electric lamp dimming.

FIGURE 2 is a schematic circuit of a multiposition lamp dimmer control embodying a diode rectifier and a controllably conductive device comprising a four-layer diode.

FIGURE 3 is a block diagram of a typical four-layer diode of the PNPN type.

FIGURE 4 shows a characteristic curve of the four-layer diode of FIGURE 3.

FIGURES 5 through 14 are schematic electrical circuits of the five steps of the dimmer control of the circuit of FIGURE 2, with accompanying voltage curves illustrating their respective control actions.

FIGURE 15 is a modified circuit arrangement for the "low" step of FIGURES 7 and 8.

FIGURE 16 shows a possible modification of the "intermediate" step connection of FIGURE 9.

FIGURES 17 through 25 are schematic electrical circuit steps for the Zener diode embodiment of this invention, with accompanying explanatory voltage curves.

FIGURE 26 shows a circuit diagram of a novel combination of a switch, a rectifier, and a controlled rectifier.

FIGURE 27 shows the voltage and current characteristics of the controlled rectifier of FIGURE 26 for a given gate current.

FIGURE 28 is a perspective diagram which illustrates the manner in which the control means for the controlled rectifier is coordinated with the switching means which controls the circuit relationship between the controlled rectifier and the rectifier.

FIGURES 29, 30 and 31 illustrate the position of the switch controlling cam of FIGURE 28 in the off position, the position for full one-half cycle conduction, and the position for 100% conduction, respectively.

FIGURE 39 is a circuit diagram of my novel combination of a switching means, a rectifier means, and a transistor device where the transistor is the controllable conductive device of the combination.

FIGURES 40 through 44 illustrate the voltages of the circuit of FIGURE 39 as plotted against a common time base for describing the operation of the circuit.

Figure 32:
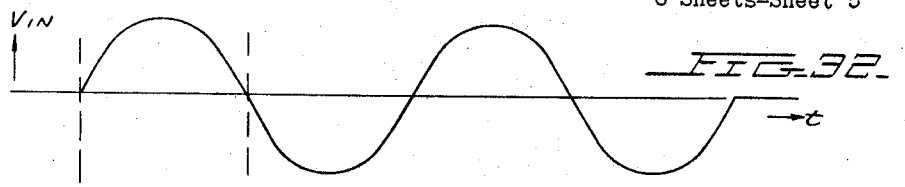
FIGURES 32 through 38 are diagrams illustrating the various voltages and currents in the circuit of FIGURE 26 as plotted against time and to a common time scale for describing the operation of the circuit of FIGURE 26.

Referring now to FIGURE 1, I have generally shown a control device of the type to which the invention is directed housed within a housing 15 and having an A.-C. source 16 connected to one end thereof. The A.-C. power delivered from source 16 is controlled in the manner to be described hereinafter by the means within control device housing 15, and the control power output appears across terminals 17 and is connected to input terminals 19 by wires or leads 18 where terminals 19 are the terminals of a load 20 formed of electrical lamps.

The electrical lamps 20 are shown as a load for purposes of illustration only, and it will be apparent that any type of load can be used.

The first embodiment of my novel structure is shown in FIGURE 2 and comprises the control means contained within control housing 15 of FIGURE 1.

Referring to FIGURE 2, a protective fuse 21 is connected in series with A.-C. source 16. The switch means of the novel combination of switching means, rectifier means, and four-layer diode means is formed of a two-section multiposition ganged switch 22 which includes a pair of switch arms 23 and 24. Switch arm 23 is connected to source 16 by leads 25 and 26, while switch arm 24 is connected to the load and terminal 17 by the leads 27 and 28. The return lead 29 extends from the lower terminal 17 to the lower end of source 16 and is preferably grounded.

The switch 22 has five positions or steps. These positions are, referring to the connection of switch arms 23 and 24 to the various stationary switch contacts: 40, 40' (off); 41, 41' (low); 42, 42' (intermediate); 43, 43' (medium); 44, 44' (full or 100%). As the switch arms are moved between these positions, it will be seen that a smooth change in the light output of the lamp load 20 is achieved.

When the load is the lamp load, as shown in FIGURES 1 and 2, and as has been set forth in my co-pending application Serial No. 827,232, to dim lights with a pleasing psychological effect, a change in the lumen output of approximately 45 percent between different steps is desirable. Therefore, in the device of FIGURE 2, the output power to the lamp load for the various switching positions is such that lumen outputs are produced of 15 percent, 30 percent, 75 percent, and 100 percent for the four steps to achieve the desirable pleasing psychological effect.

Clearly, other ratios and arrangements would come within the scope of the invention and, although the invention is described in FIGURE 2 in connection with a lamp load, it will be apparent that any electrical load could be used.

The rectifier which is one of the elements of my novel combination is shown in FIGURE 2 as rectifier 30 which has one end connected to contacts 42 and 43 by leads 45, 47 and 48, and has its other end connected to switch arm 24 by lead 46, as shown in FIGURE 2.

The controllably conductive element of the combination is formed of the four-layer switching diode 35 which is connected to switch arm 23 by lead 26 and to contacts 41', 43' by leads 50 and 51. It will be noted that although the device 35 is called a four-layer diode, it is in fact a substantially different type of device than is a diode, as the term is normally used. The similarity in terms exists only because both devices have only two terminals.

The four-layer diode 34 is schematically shown in FIGURE 3. Thus, in FIGURE 3 the diode is comprised of a PNPN array of elements. The operation of this devise is fully set forth in the article "The Four-Layer Diode," by Dr. William Shockley, which appears in the February 27, 1959, issue of "Electronics." As discussed in that article, the characteristics of the four-layer diode of FIGURE 3 are those set forth in FIGURE 4 which shows the forward conducting characteristic of the device, it being noted that the device has typical rectifier characteristics in the reverse direction. In FIGURE 4, when a positive forward voltage ($+V_F$ in FIGURE 3) is applied to terminal $t_2$ and the lower terminal $t_1$ is grounded, the voltage will build up across the diode without any substantial current flow therethrough. This is shown as curve portion C1 in FIGURE 4. When the voltage $+V_F$ reaches the break-over voltage value ($V_{BO}$), however, there is a sharp decrease in the voltage across the four-layer diode, as illustrated by portion D, and the diode is rendered relatively conductive in the forward direction, as illustrated by curve C2. Thus, the diode 35 can be said to switch over or break-over to a low impedance state when there is a rise in voltage slightly above $V_{BO}$. This will be seen to be equivalent to the control of the well-known thyratron device.

The presently available silicon four-layer diodes have a high impedance state of the order of 2 to 200 megohms and a low impedance state of less than 20 ohms. Furthermore, the switching time in going from the high impedance state to the low impedance state is of the order of a microsecond. The circuit through the switch diode remains "closed" as long as the required holding current $I_H$ of curve C2 is maintained. Once the current falls below that value, however, the device directly resumes its open or high impedance condition.

The essence of the present invention is to utilize this type of controllably conductive element in a power regulating circuit in a novel combination with the switching means 22 30.

Referring to FIGURE 5, I have shown the active portion of the circuit of FIGURE 2 when switch 22 is in its "off" position and switch members 23 and 24 engage contacts 40 and 40'. In this position it is clearly understood that there will be zero voltage applied to the load, as shown in FIGURE 6, which shows the load voltage plotted as a function of time. When the switch blades 23 and 24 are moved to their "low" position and engage contacts 41 and 41', the four-layer diode as shown in FIGURE 7 is connected in series with source 16 and load 20 through the leads 53 and 54.

In this condition, and as shown in FIGURE 8, the four-layer diode 35 is in its open or high impedance state until time $t_1$ so that during this portion of the positive half cycle, no voltage is transferred to load 20. When, however, the instantaneous voltage of the A.-C. source reaches the firing voltage of four-layer diode 35, the diode assumes its low impedance state so that voltage can now be transferred from source 16 to load 20, as shown in the shaded arear 62 of FIGURE 8.

Assuming the load to be a resistive type filament lamp, the condition of FIGURE 8 can represent, for example, a 15 percent lumen output of the lamp load. It is to be noted that in the negative half cycle the four-layer diode 35 operates in the manner of any typical diode and blocks the full reverse voltage without any switch operation. It is to be further noted that for all practical purposes, the current $I_H$ of FIGURE 4 through four-layer diode 34 will be sufficient to maintain four-layer diode 35 conductive until substantially the end of the half cycle.

While the preferred embodiment of this low step for a lamp load delivers 15 percent of the lumen output, it is clear that any other lumen output can be achieved by altering the time $t_1$ which the diode is fired through the selection of an appropriately rated diode.

In the event that the reverse voltage during the negative half cycle may become excessive or exceed the avalanche break-down of the device, the alternate circuit shown in FIGURE 15 can be used where the diode 30 is connected in series with break-over diode 35, instead of being switched out of the circuit, as shown in FIGURE 7.

To achieve a further increase in the lumen output of the lamp load, a second switching operation is performed so that the switching device is placed in its "intermediate" step shown in FIGURE 9, where the switch members 23 and 24 of FIGURE 2 engage contacts 42 and 42', respectively. In this position the diode 30 is connected in the circuit as shown so that there is typical half-wave conduction through diode 30, as illustrated in FIGURE 10. In this condition, approximately 30 percent lumen output is obtained from the load, since there is conduction during the positive half cycle 66 of FIGURE 10 and blocking during the negative half cycles in the typical manner.

In the next or "medium" step shown in FIGURE 11, switch members 23 and 24 engage contacts 43 and 43' to arrange rectifier 30 and four-layer diode 35 in parallel whereby, as shown in FIGURE 12, the diode 30 permits conduction during the negative half cycles, while four-layer diode 35 exerts a control on the positive half cycles, as illustrated in FIGURE 8. In this condition, there can be an approximately 45 percent of rated lumen output from the lamp load 20. Clearly, by having a time $t_1$, which is different from that shown in FIGURE 8, the percentage of power transferred from source 16 to load 20 can be adjusted to any desired percentage for this step.

The "full or 100%" rated step is assumed, as shown in FIGURE 13, when switch members 23 and 24 engage contacts 43 and 43' to directly connect source 16 to lamp load 20, so that, as illustrated in FIGURE 14, the full voltage is applied to the lamp load.

It will be apparent that there are several modifications which are readily suggested to those skilled in the art whereby different percentage values of lumen output can be switched in and out, and where a greater or smaller number of switching steps can be used. However, all of these modifications come within the scope of this invention. Thus, as has been described for the case of FIGURE 15, during the "low" step of FIGURE 7 the diode 30 can be placed in series with four-layer diode 35 to protect the four-layer diode 35 under inverse voltage conditions.

This readily suggests that an auxiliary diode can be permanently connected in series with four-layer diode 35 for continuous reverse voltage protection. FIGURE 16 illustrates a further possible modification of the circuit which is useful during the "intermediate" step of FIGURE 9 wherein the four-layer diode 35 is connected in parallel with rectifier 30, both being conductive in the same direction. With this connection the current flow to the load during the conduction periods of the breakover diode divide between the two devices so that rectifier 30 may be switched in a more convenient manner.

A still further possible modification and which is not meant to exhaust all of the various possibilities in the connection of a second four-layer diode in parallel with the four-layer diode 35 and arranged to have its direction of conduction in a direction opposite to that of FIGURE 7. If such a device were used and selectively switched into the circuit by the switch means such as switch 22, a further switching step is available whereby conduction similar to that of FIGURE 8 for the positive half cycles would be available during the negative half cycles. This connection would, for example, represent an intermediate step in going from 30% lumen output of FIGURE 10 to the 75% lumen output of FIGURE 12.

The step type species of the present invention has been described above where a four-layer type diode is used as the controllably conductive element of the combination of a switching means, a rectifier means, and a controllably conductive device. If desired, the controllably conductive element could be the type device known as the Zener diode.

The complete circuit incorporating the combined switch, Zener diode, and rectifier is not shown since it is believed to be apparent to one skilled in the art from a description of FIGURE 2.

Thus, I have shown three stages of the circuit in FIGURES 17, 20 and 23, respectively. The full or 100% rated power or lumen step will be similar to the circuit of FIGURE 13, while the off or zero step will be similar to the circuit of FIGURE 5. The circuit includes the use of Zener diodes 80 and 81 (FIGURES 17 and 20) and rectifier 82 (FIGURE 23) where these elements are switched between various circuit relationships with respect to one another. In the "medium step" of the device shown in FIGURE 17, the Zener diode 80 is connected directly in series with source 16 and load 20 by means of leads 53', 54' and 29'.

Assuming that the load 20 is resistive, the operation of the circuit of FIGURE 17 is best understood by reference to FIGURES 18 and 19 where FIGURE 18 shows the voltage across the Zener diode 80, while FIGURE 19 shows the current through resistive load 20.

The characteristic operation of Zener diodes is well known in the art in that the diodes are fully conductive in one direction and non-conductive in the opposite direction up to a given reverse voltage whereupon they become conductive when the voltage in the reverse direction exceeds some predetermined value.

Thus, in FIGURE 17, during the positive half cycle 86 of the voltage, load current flows as illustrated in the shaded area of FIGURE 19. When the voltage reverses, the diode 80 remains non-conductive until the instantaneous voltage across the diode assumes the value $V_Z$ of FIGURE 18. At this point, the diode becomes conductive and remains conductive until the instantaneous voltage during the negative half cycle falls below the critical value $V_Z$, whereby the voltage illustrated in shaded area 87 is transferred to load 20. Thus, as illustrated in FIGURE 19, a current will flow for the duration of the voltage interval 87. Accordingly, in the circuit condition of FIGURE 17, there will be a full current flow during the first half cycle and limited current flow during the alternate half cycle.

In order to decrease the output current to the load 20, a switching operation is performed so that, as shown in FIGURE 20, a second Zener diode 81 is connected in series blocking relationship with respect to Zener diode 80. Under this condition, the positive half wave voltage of FIGURE 18 will be modified as illustrated in FIGURE 21 whereby, instead of the full forward half wave voltage 86 being applied to the load, only the modified voltage area 91 will be applied to the load so that a resultant smaller current will flow through the lamp load 20 during positive half waves as shown in FIGURE 22. The negative half waves remain controlled by Zener diode 80 in the manner described for FIGURE 17 so that there will be a net decrease in power transferred to load 20 dependent upon the characteristic of the firing voltage of the Zener diodes used.

In the "low" step illustrated in FIGURE 23, it will be apparent that a switching operation has been performed so that Zener diode 81 of FIGURE 20 is replaced by a normal rectifier 82 which is connected in series blocking relationship with respect to Zener diode 80. In this arrangement, the positive half wave voltage which, for example, in FIGURE 19 was able to drive current through the forward direction of Zener diode 80 will now be absorbed in the blocking direction of rectifier 82 so that no current will flow to load 20 during reverse voltage conditions as shown in FIGURE 25.

During the negative half cycle, however, the Zener diode 80 will operate in the same manner as described in FIGURES 17 and 20 so that a negative current pulse flows through the load 20. This represents the low lumen step and could, for example, correspond to the 15% lumen output of FIGURE 7 where a four-layer diode was used.

Referring now to FIGURE 26, it will be observed that FIGURE 26 (as well as FIGURE 39) illustrate the species of the invention whereby continuous power control from substantially 0% to substantially 100% is achieved. In FIGURE 26 an A.-C. power source is connected at terminals 110 and 111. Terminal 111 is connected in series with movable switch member 112 of the switch generally shown as switch 113. Switch member 112 is movable from a first switching position at which it engages contact 114 to a second switching position at which it engages contact 115.

Switch 113 cooperates with a second switch generally shown as switch 116 and is comprised of a movable switch member 117 which is ganged to movable switch member 112 and moves between contacting positions at which it is connected to either contact 118 or contact 119. The switches 113 and 116 generally operate to reverse the connection of controlled rectifier 119 in the circuit including terminals 110 and 111.

Thus, in the switch position shown, when terminal 111 is positive, the controlled rectifier 119 will conduct current in its forward direction. If, however, switches 113 and 116 are operated to their second switch position so that switch blades 112 and 117 engage contacts 114 and 118, respectively, the polarity of controlled rectifier 119 will be reversed so that when the potential of terminal 111 is positive, the rectifier 119 will be connected in its blocking direction.

The circuit from terminal 111 and through rectifier 119 then includes a load 120 which may be of any desired type such as a lamp, and the A.-C. circuit then returns to terminals 110.

It is clear that the purpose of the novel control system to be described hereinafter is to control the application of power from terminals 110 and 111 to the load 120. A rectifier device 121 of any desired type, such as the type 25H50 manufactured by the International Rectifier Corporation, is connectable in parallel with controlled rectifier 119 by switch means 122 in the manner shown. As will become apparent hereinafter, the polarity of rectifier 121 is immaterial. While rectifier 121 is described as being a semi-conductor type device, it will also be apparent that any rectifier means could be used such as an electron tube type device.

The controlled rectifier 119 may be of the type ZJ39A manufactured by the General Electric Company. The characteristics of this type of device are well-known in the art and are fully described, for example, in the article "Solid State Thyratron Switches Kilowatts," by Frenzel and Gutzwiller, which appears in the March 28, 1958, edition of Electronics.

In general, these devices are formed of a three-junction semi-conductive device and are presently available with blocking voltages up to 400 volts at load currents up to 16 amperes. If need be, series and parallel circuits may be used for higher power applications.

The three-junction device is provided with a gate terminal which operates in much the same manner as the grid of a thyratron, whereby the characteristic of the device is much like a thyratron in that it represents essentially an open circuit with negative anode to cathode voltage, while the forward characteristic is such that a critical positive anode to cathode voltage which is a break-over voltage is provided which is dependent upon the gate current signal.

A typical characteristic of the operation of this device is shown in FIGURE 27 wherein $V_r$ and $I_r$ represent reverse voltage and reverse current, respectively, while $V_f$ and $I_f$ represent forward voltage and forward current, respectively. The reverse characteristic is seen to be similar to that of a typical semi-conductor rectifier. The forward characteristic of the device, however, is such that the voltage will rise to a value $V_{BO}$ at a current $I_{BO}$ (break-over voltage and break-over current, respectively) whereby when a voltage of the magnitude of $V_{BO}$ is achieved in the forward direction across the controlled rectifier, the rectifier will "fire" and the current will be that represented by characteristic 123. The value of the firing voltage $V_{BO}$ is controlled in magnitude by the gate current, whereby a bias applied to the gate circuit which is controllable can control the voltage at which the device becomes conductive.

The present invention takes advantage of this novel characteristic and uses the controlled rectifier to control the transfer of current to load 120 during the half cycle that is controlled by the rectifier. The control circuit for this purpose, and which is connected between the gate 124 and the cathode of controlled rectifier 119, is comprised of a phase shifting system generally shown as system 125. More specifically, the phase shifting system is comprised of a transformer 126 which has its primary winding connected across terminals 110 and 111 and steps down voltage so that the output voltage of the center tapped secondary winding is 2.5 volts for each half winding.

The center tap is connected to the cathode of the controlled rectifier 119 through a diode 127 which may be of the type 1N536. The outer ends of the secondary winding are connected in series with a capacitor 128 which may be a 150 microfarad capacitor and a potentiometer 129 which has a center tap 130 and may be a 200 ohm potentiometer. The gate 124 is connected to the potentiometer rider 131 of potentiometer 129. A switch 132 is connected across the lower half of potentiometer 129 and initially is in short circuiting relationship with respect thereto.

As will be seen hereinafter, as the rider 131 is moved in the direction of the arrow 133, the current output of the phase shifter applied between gate 124 and the cathode of controlled rectifier 119 will vary in such a manner as to cause the controlled rectifier 119 to go from a non-conductive state throughout the half cycle to a longer and longer conductive state throughout the half cycle.

As the rider 131 passes the center of potentiometer 129, a switching operation which will be described hereinafter is performed so that the phase shift begins once again from a non-conductive to a fully conductive state for the controlled rectifier 119.

The operation of the device of FIGURE 26 is best understood by reference to FIGURES 32 through 38. FIGURE 32 shows the voltage $V_{in}$ as a function of time and is the A.-C. voltage appearing across terminals 110 and 111. When a voltage is connected to these terminals and it is desired to have a zero output power, the switches are in the positions shown, and the rider 131 is in its uppermost position. Under this condition, controlled rectifier 119 is biased to a full cut-off condition (the voltage $V_{bo}$ of FIGURE 27 is greater than the peak voltage of the voltage $V_{in}$) so that when terminal 111 becomes positive, there is no conduction through controlled rectifier 119 except for the small leakage current therethrough which is at the most of the order of a few milliamperes, while in the reverse direction when terminal 111 is negative, controlled rectifier 119 operates in the manner of any rectifier in its blocking direction. Thus, substantially no power is delivered to load 120.

Figure 34:
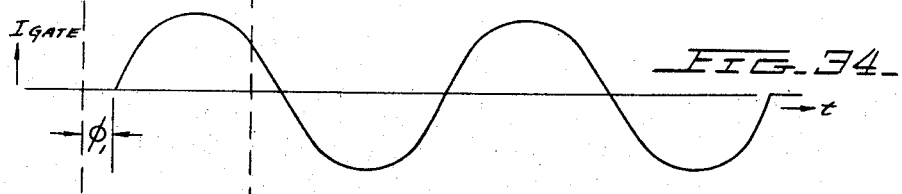

If it is now desired that a relatively small amount of power be delivered to load 120, the input current to gate 124 is varied in phase with respect to the input voltage in the manner shown in FIGURE 34, where the gate current is caused to lag the voltage $V_{in}$ of FIGURE 32 by an amount $\phi_1$. The effect of this biasing current is such that at a relatively late portion of the forward conducting cycle of controlled rectifier 119, the required break-over voltage is achieved, and the diode will conduct.

Figure 35:
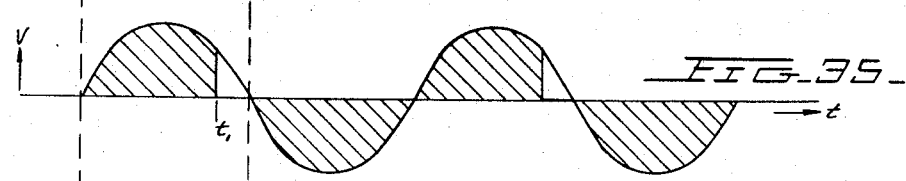

Thus, in FIGURE 35 at time $t_1$, the bias current $I_{gate}$ of FIGURE 34 has reached a sufficiently high value to cause conduction (shown in the unshaded area of the curve of FIGURE 35) of rectifier 119 in its forward direction. It will be noted that FIGURE 35 in the shaded area shows the voltage which appears across the controlled rectifier 119 so that the rectifier 119 absorbs or blocks substantially all of the input voltage with the exception of the very small amount at the end of its conducting cycle which represents the relatively small voltage which is transferred to the load 120.

Figure 33:
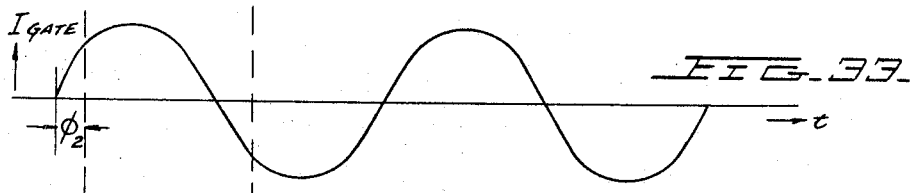
Figure 36:
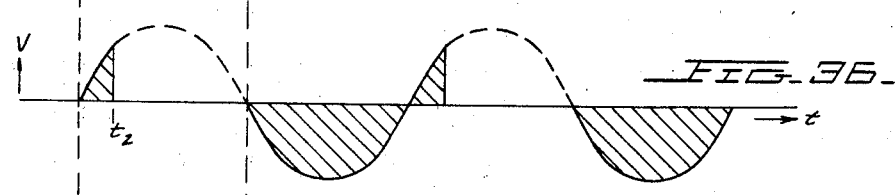

If it is now desired to increase the power applied to load 120, the rider 131 of potentiometer 129 is moved downwardly so that, for example, its output gate current has the phase shift shown in FIGURE 33, which leads the voltage $V_{in}$ by an amount $\phi_2$. Under this condition, the gate current reaches a firing value at an earlier time than it did in FIGURE 34 so that as shown in FIGURE 36, the controlled rectifier 119 fires at an earlier time $t_2$ whereby the controlled rectifier 119 absorbs less voltage than it did previously, and a greater amount of voltage, indicated by the unshaded area in FIGURE 36, is transferred to load 120.

It will be noted that this process is a continuous process from substantially zero conduction through substantially 180° conduction where the gate current is phase shifted so that the controlled rectifier fires almost immediately when the input voltage begins to go positive.

At this point, the controlled rectifier 119 is completely conductive throughout its corresponding half cycle. During the opposite half cycle, however, the rectifier 119 is in a blocking direction, and this reverse voltage is not applied to load 120.

In accordance with the present invention and in order to gain continuous control of the power applied to load 120 from 0% to 100% of the available power, I have provided a novel switching means and rectifier which cooperate with the controlled rectifier 119 whereby controlled rectifier 119 is reversed in polarity by switches 113 and 116 to be able to control the half cycle which it normally blocked during half cycle operation and to reverse the fully conductive characteristic of rectifier 119 when it is fully replaced by rectifier 121 through the switch 122.

The fully conductive state of controlled rectifier 119 is achieved when rider 131 is aligned with the center tap 130 of potentiometer 129.

At this point, by mechanical interlocking means running from the operating shaft of potentiometer 129 to the various switches, switch 122 is closed, switch 132 is opened, and switches 113 and 116 are moved to their lower switch positions. Under this condition, the same amount of power will be transferred to load 120.

Thus, when rider 131 was at center tap 130, rectifier 119 conducted for a full half cycle. By causing the aforementioned switch operation, rectifier 121 replaces controlled rectifier 119 for conduction during the positive half cycle, while controlled rectifier 119 is connected with its forward direction in what was previously its blocking direction. Since switch 132 has now opened, the phase shifted gate current is such that the controlled rectifier 119 will normally be cut-off since the bias reverts to the condition which it previously assumed when the rider 131 was at the top of potentiometer 129.

As the rider 131 now continues to move downwardly from center tap 130, it will be apparent that controlled rectifier 119 will begin to conduct at an earlier and earlier portion of its cycle, whereby the power applied to load 120 assumes a greater and greater amount.

Figure 37:
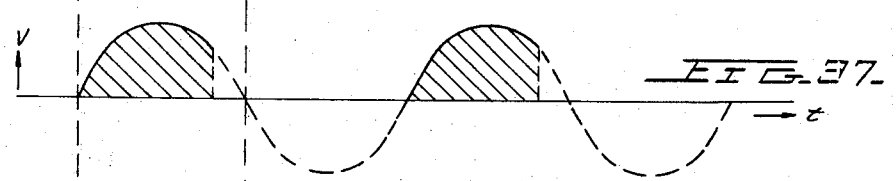

For example, in FIGURE 37 the voltage absorbed by control rectifier 119 during conduction in its new forward conduction direction is illustrated in the shaded lines.

As was the case of FIGURE 35, with a phase shifted bias of the type shown in FIGURE 33, rectifier 119 conducts only in the later portion of its forward conducting cycle. In FIGURE 37, however, since rectifier 121 is connected in the blocking direction of controlled rectifier 119, it conducts during the reverse voltage cycle, whereby the voltage applied to load 120 is the voltage shown in FIGURE 37 in dotted lines.

Figure 38:
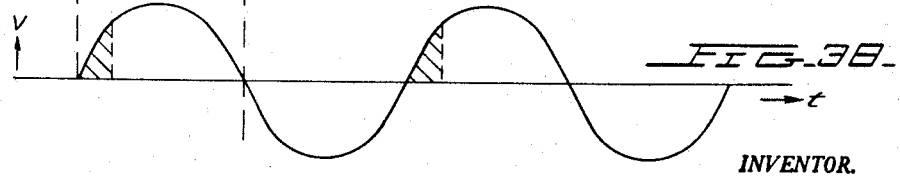

As the gate bias of gate 124 is progressively phase shifted to a point shown, for example, in FIGURE 34, controlled rectifier 119 conducts at an earlier point as shown in FIGURE 38, whereby an increasing amount of power is supplied to load 120. This process continues until the full voltage of terminals 110 and 111 is connected across load 120.

Accordingly, by means of the novel combination of a switching means such as switching means 122, 113, 116 and 132 and a rectifier means such as rectifier 121 and a controllable conductive element such as controlled rectifier 119, I achieve continuous power control from 0% to 100% of the available power which can be connected to load 120.

The manner in which the switches 122, 113, 116 and 132 are operated is illustrated in FIGURE 28 in perspective view which shows an operating knob 134 which is externally accessible of a mounting means which mounts the complete assembly. A shaft 135 extends from operating knob 134 and is connected to the potentiometer 129, whereby a clockwise rotation of shaft 135 will cause a change in the rider position of potentiometer 129 which is equivalent to movement of rider 131 in the direction of arrow 133 in FIGURE 26.

The shaft 135 which operates potentiometer 129 has a further extending portion 136 which is connected to a cam plate 137. The cam plate 137 is so constructed that after a predetermined rotation of say 180°, its rounded camming portion 138 will progressively engage operating members 139, 140 and 142. Operating member 139 is connected to a microswitch 143 which corresponds to switch 122 of FIGURE 26 to cause operation of switch 122 from the position shown in FIGURE 26 to its lower position.

Thereafter the camming surface 138 of cam plate 137 will engage operating member 140 of micro-switch 144 which corresponds to switch 132 so that the switch is operated from its short-circuiting position of FIGURE 26 to the open position. Finally, a small continued rotation of knob 134 and its cam plate 137 will cause cam surface 138 to engage operating member 142 which in turn is connected to micro-switches 145 and 146 which correspond to switches 113 and 116, respectively.

This sequential operation is illustrated in FIGURES 29 through 31 where, in FIGURE 29, the zero power position is indicated. The position shown further corresponds to a position whereby rider 131 of FIGURE 26 is in its uppermost position with respect to potentiometer 129. As knob 134 is rotated so as to cause rider 131 of FIGURE 26 to move downwardly and increase the output power to load 120, and at a point immediately preceding full half wave conduction of controlled rectifier 119, camming surface 138 engages operating member 139 to cause operation of switch 122 of FIGURE 26. This operation connects rectifier 121 in parallel with rectifier 119 with both conducting in the same direction. Thus, there is no substantial change in the power delivered to load 120. A small continued rotation causes operation of contact 132 which causes an immediate change in the phase shift of the gate current of controlled rectifier 119 to such a value that the rectifier is cut-off in its conducting direction. There is still no change in the power applied to load 120, however, because the rectifier 121 conducts current during the full half cycle.

A further and continued small rotation to the position of FIGURE 30 causes operation of switches 113 and 116 of FIGURE 26, whereby the polarity of controlled rectifier 119 is reversed. The switches aforementioned are held in the operated position during the subsequent 180° rotation of cam plate 137 in the manner shown in FIGURE 21 by virtue of the enlarged diametrical portion of cam plate 137.

Thus, it is seen that there is a simple transition from full half cycle conduction to preparation for greater than full half cycle conduction in the novel system.

From the foregoing description, it will be apparent than many types of controllable conductive devices having characteristics similar to the characteristic of controlled rectifier 119 of FIGURE 26 can be used in a manner similar to that described for the circuit of FIGURE 26. By way of example, the controlled rectifier 119 can be replaced by any typical thyratron wherein the grid of the thyratron is controlled in the manner disclosed for the gating electrode 124 of controlled rectifier 119.

It will also be apparent that any type of controlling circuit can be utilized for either the controlled rectifier gate or for the thyratron grid, the phase shifting circuit 125 being shown merely for purposes of illustration. Thus, a pulse generating circuit wherein the pulse is phase shifted with respect to the input voltage can be readily adapted for combination with my novel system.

A further application of the combination of a rectifier, a switching means, and a controllable conductive device is set forth in FIGURE 39 wherein the controllable conductive device comprises transistor 150 which is of standard construction and may be either a PNP type of a NPN type device.

The emitter 151 is connected to input terminal 152 and is in the series circuit including collector 153, rectifier 154, a switching means generally shown as switching means 155 which will be described hereinafter, a load 156 which is to have an adjustable amount of current supplied thereto, and the other input terminal 157. A source of A.-C. voltage is applied to terminals 152 and 157 which correspond to terminals 111 and 110 of FIGURE 26, and the transistor 150, rectifier 154 and switching means 155 are interposed between the A.-C. source connected to the terminals and the load 156 which is to have controlled current supplied thereto. The switching means 155 includes a first switch member 158 which normally engages contact 159 and switching member 160 which normally engages contact 161.

When the switch members 158 and 160 are in the position shown, it will be apparent that rectifier 154 is connected in parallel with a transistor 150 with this parallel combination being connected in series with load 156. The switch members 158 and 160 are movable to a second switching position whereby switch member 160 disengages with respect to contact 161, and switch member 158 engages contact 162. When this switch position is assumed, it is seen that rectifier 154 is connected in series with transistor 150 and load 156. The controllable conductive element of the circuit of FIGURE 39 is the transistor 150 which is controlled by a bias applied from control source 163 which is connected through resistor 164 to the emitter-base circuit of transistor 150.

The control source 163 is schematically illustrated by a block in FIGURE 39 and could be of any desired control circuit for applying a predetermined bias current to maintain the transistor 150 in a cut-off condition until the potential of terminal 152 reaches some predetermined value. By way of example, the control source 163 can comprise a source of phase shiftable current whose phase with respect to the voltage applied to terminals 152 and 157 is determined by the position of rotatable control element 165 in much the same manner as that shown for the source 125 of FIGURE 26, where the phase shift of the output control current is dependent upon the angular position of shaft 135 of FIGURE 28. Note that the transistor polarity, since the transistor is a symmetric device, is unimportant in FIGURE 39.

The circuit of FIGURE 39 is operable to deliver current between the value of 0% to 100% of the full current available for load 156. In the initial position corresponding to substantially zero power for the circuit of FIGURE 39, the switch means 155 is in the opposite position to the position shown, and the output control current from source 163 is such as to maintain the transistor 150 cut-off for any instantaneous value of voltages appearing across terminals 152 and 157.

When a relatively small amount of current is desired for load 156, the bias current from source 163 is adjusted, as by adjusting the phase shift of the current with respect to the input voltage at terminals 152 and 157 so that at time $T_1$ of FIGURE 41 which is plotted on the same time scale as the input voltage at terminals 152 and 157 shown in FIGURE 40, the transistor 150 becomes conductive. Thus, the voltage transferred to load 156 from the input voltage source is the relatively small portion shown in FIGURE 41 at the end of the positive half wave. During the negative half wave, it will be observed that there is no voltage transferred to load 156 since the voltage of this negative half wave appears across rectifier 154.

In order to progressively increase the output current, the phase shift or degree of bias applied to emitter 151 is progressively changed to cause the transistor to conduct at progressively earlier times. Thus, for example, in FIGURE 42, the bias from source 163 is so adjusted that the transistor becomes conductive at time $T_2$.

Accordingly, a relatively large portion of the positive half wave voltage of FIGURE 40 appears across load 156, the negative half wave voltage portions still being absorbed by rectifier 154. Once the emitter bias current is so adjusted that the transistor conducts throughout the full positive half wave cycle, a switching operation is necessary to permit a further increase in the length of time that voltage is transferred from the input source to the load.

Thus, in much the same manner as was described in FIGURES 26 and 28, rotatable control element 165 may be mechanically connected to switch members 158 and 160 so that when the position of full bias is achieved, the switch members 158 and 160 will be operated to their second switch position. Thus, switch member 158 will engage contact 159, and switch member 160 will engage contact 161, whereby rectifier 154 will be connected in parallel with transistor 150. At the same time, the output bias of supply 163 is so altered that the transistor 150 is rendered non-conductive for any voltage condition in the emitter-collector circuit.

This can, for example, be achieved through the use of a circuit similar to the center tap potentiometer 129 of FIGURE 26. Under this condition, the full half wave current of one of the positive or negative half waves of the input voltage will be transmitted to load 156 through the rectifier 154 which is connected in parallel with the now cut-off transistor 150. The transistor 150 will now operate to control the degree of current which passes during the half cycle which it now controls when the transistor is made conductive at earlier and earlier times by variation of the input control power.

By way of example, in FIGURE 43, and with the transistor caused to become conductive at time $T_3$, the voltage applied to the load 156 is the half wave cycle of FIGURE 40 and the full negative half cycle which is passed by rectifier 154.

As the bias is changed to cause earlier conduction of transistor 150, the voltage appearing across load 156 is, for example, that shown in FIGURE 44, wherein conduction begins at time $T_4$, and almost 100% of the input voltage is applied to the load.

It is to be clearly noted that this regulating process is a continuous one whereby a variation of applied power to load 156 may be varied from substantially zero to substantially 100% through the use of the novel circuit of FIGURE 39.

In the foregoing the invention has been described solely in connection with specific illustrative embodiments thereof. Since many variations and modifications of the invention will now be obvious to those skilled in the art, I prefer to be bound not by the specific disclosure herein contained but only by the appended claims.

I claim:

1. A power regulating means connectable between an A.-C. source and a load for controlling the length of time in one cycle that current flows to the said load; said power regulating means comprising a rectifier, a controllably conductive means and a switching means for connecting said rectifier and said controllably conductive means in a plurality of predetermined circuit relationships: both said rectifier and said controllably conductive means being connected for carrying load current in a first of said predetermined circuit relationships; only said controllably conductive means being connected for carrying load current in a second of said predetermined relationships; said controllably conductive means being characterized in blocking current flow therethrough in a first direction, and controllably passing current in a direction opposite said first direction; said controllably conductive means being continuously controllable throughout substantially all of a half cycle of current flow to permit initiation of current flow at a preselected time within said half cycle; said controllably conductive means comprising a silicon controlled rectifier.

2. A power regulating means connectable between an A.-C. source and a load for controlling the length of time in one cycle that current flows between said A.-C. source and said load; said power regulating means comprising a rectifier; a controllably conductive means and a switching means electrically connected to said rectifier and said controllably conductive means and operable for connecting said rectifier and said controllably conductive means in a plurality of predetermined circuit relationships with respect to said A.-C. source and said load; said controllably conductive means being characterized in blocking current flow therethrough in a first direction and controllably passing current in a direction opposite said first direction; a first of said plurality of predetermined circuit relationships comprising the connection of said controllably conductive means in series with said A.-C. source and said load; a second of said plurality of predetermined circuit relationships comprising the parallel connection of said rectifier and said controllably conductive means with respect to one another and in series with said A.-C. source and said load; said rectifier conducting load current in the blocking direction of said controllably conductive means in said second of said plurality of predetermined circuit relationships.

3. The device substantially as set forth in claim 2 wherein a third of said plurality of predetermined circuit relationships comprises the direct connection between said A.-C. source and said load.

4. The device substantially as set forth in claim 2, wherein said controllably conductive means is continuously controllable through substantially all of a half cycle of current flow to permit initiation of current flow at a predetermined time within said half cycle.

5. The device substantially as set forth in claim 2 wherein said controllably conductive means comprises a 4-layer diode.

6. In combination for a power regulating means for regulating the power supplied to a load from an A.-C. source; a rectifier, a controlled rectifier and a switching means for connecting said rectifier and said controlled rectifier in a plurality of circuit relationship with respect to said A.-C. source and said load; said switching means including first cooperable contact means, second cooperable contact means, and a third cooperable contact means; operation of said first contact means connecting said controlled rectifier in series with said A.-C. source and said load; operation of said second contact means connecting said rectifier in parallel with said controlled rectifier with predetermined polarity relationship between said rectifier and said controlled rectifier; operation of said third contact means reversing the polarity of said controlled rectifier with respect to said rectifier.

7. The device substantially as set forth in claim 6 which further includes control means for controlling the conduction of said controlled rectifier; said control means rendering said controllably conductive means nonconductive when said controlled rectifier is reversed in polarity with respect to said rectifier whereby there is no change in power to said load upon operation of said third contact means.

8. The device substantially as set forth in claim 7 wherein said control means includes a center tapped potentiometer; a first half of said potentiometer being operable to control said controlled rectifier when said first contact means connects said controlled rectifier in series with said A.-C. source and said load; the other half of said potentiometer being operable to control the conducduction of said controlled rectifier when said third cooperable contact means reverses the polarity of said controlled rectifier with respect to said rectifier.

9. A power regulating means connectable between an A.-C. source and a load for controlling the length of time in one cycle that current flows between said A.-C. source and said load; said power regulating means comprising a rectifier, a controlled rectifier and a switching means electrically connected to said rectifier and said controlled rectifier and being operable for connecting said rectifier and said controlled rectifier in a plurality of predetermined circuit relationships with respect to said A.-C. source and said load; said controlled rectifier being characterized in blocking current flow therethrough in a first direction and controllably passing current in a direction opposite said first direction; a first of said plurality of predetermined circuit relationships comprising the connection of said controlled rectifier in series with said A.-C. source and said load; a second of said plurality of predetermined circuit relationships comprising the parallel connection of said rectifier and said controlled rectifier with respect to one another and in series with said A.-C. source and said load; said rectifier conducting load current in the blocking direction of said controlled rectifier in said second of said plurality of predetermined circuit relationships; a controlled means for said controlled rectifier; said controlled means for said controlled rectifier including a center tapped potentiometer; a first half of said center tapped potentiometer being operable to control the conductivity of said controlled rectifier during said first predetermined circuit relationship; the other half of said center tapped potentiometer being operable to control the conduction of said controlled rectifier during said second predetermined circuit relationship.

10. The device substantially as set forth in claim 2 wherein said controllably conductive means comprises a silicon controlled rectifier; and a control means for said silicon controlled rectifier, said control means including a potentiometer electrically connected to the gate circuit of said silicon controlled rectifier; said potentiometer having a first and second range of control; said first range of control of said potentiometer being operable when said silicon controlled rectifier is in said first of said predetermined circuit relationships; said second range of control of said potentiometer being operable when said silicon controlled rectifier is in said second of said predetermined circuit relationships.

11. A light dimmer circuit for controlling the load current applied to a load from a source of A.-C. voltage comprising the combination of a rectifier, a controlled rectifier, control means for controlling the operation of said controlled rectifier and switching means for connecting said rectifier and said controlled rectifier in a plurality of predetermined circuit relationships with respect to one another; said switching means having a first and second switch position; said first switch position of said switching means connecting said controlled rectifier in series with said A.-C. source and said load with a first polarity for said controlled rectifier; said second switch position of said switching means connecting said rectifier in parallel with said controlled rectifier and connecting said controlled rectifier in series with said A.-C. source and said load with a polarity reversed from said first polarity.

12. A light dimmer circuit for controlling the load current applied to a load from a source of A.-C. voltage comprising the combination of a controlled rectifier in series with said source and said load, a rectifier, a switching means, and a control means for controlling said controlled rectifier; said switching means having a first switch position and a second switch position; said switching means connecting said rectifier in parallel with said controlled rectifier with the anode of said controlled rectifier connected to the cathode of said rectifier when said switching means is in said first switch position and said controlled rectifier in series with A.-C. source and said load whereby load current flows through said rectifier and to said load during one of positive or negative half cycles of the A.-C. voltage of A.-C. source and through said controlled rectifier during the other of said positive or negative half cycles; said switching means disconnecting said rectifier from said controlled rectifier when said switching means is in its said second switch position.

13. A light dimmer circuit for controlling the load current applied to a load from a source of A.-C. voltage comprising the combination of a controlled rectifier in series with said source and said load, a rectifier, a switching means, and a control means for controlling said controlled rectifier; said switching means having a first switch position and a second switch position; said switching means connecting said rectifier in parallel with said controlled rectifier with the anode of said controlled rectifier connected to the cathode of said rectifier when said switching means is in said first switch position and said controlled rectifier in series with said A.-C. source and said load whereby load current flows through said rectifier and to said load during one of positive or negative half cycles of the A.-C. voltage of A.-C. source and through said controlled rectifier during the other of said positive or negative half cycles; said switching means disconnecting said rectifier from said controlled rectifier when said switching means is in its said second switch position; said control means for said controlled rectifier including potentiometer means for varying the gate current of said controlled rectifier; said potentiometer having an operating member; said switch means having an operating member; said operating members of said switch means and said potentiometer being mechanically connected together.

14. A light dimmer circuit for controlling the load current applied to a load from a source of A.-C. voltage comprising the combination of a controlled rectifier in series with said source and said load, a rectifier, a switching means, and a control means for controlling said controlled rectifier; said switching means having a first switch position and a second switch position; said switching means connecting said rectifier in parallel with said controlled rectifier with the anode of said controlled rectifier connected to the cathode of said rectifier when said switching means is in said first switch position and said controlled rectifier in series with said A.-C. source and said load whereby load current flows through said rectifier and to said load during one of positive or negative half cycles of the A.-C. voltage of A.-C. source and through said controlled rectifier during the other of said positive or negative half cycles; said switching means disconnecting said rectifier from said controlled rectifier when said switching means is in its said second switch position; said control means for said controlled rectifier including potentiometer means for varying the gate current of said controlled rectifier; said potentiometer having an operating member; said switch means having an operating member; said operating members of said switching means and said potentiometer being mechanically connected together; said operating member of said switching means operating said switch from one of said first or second switch positions to the other of said first or second switch positions when said operating member of said potentiometer causes substantially full conduction of said controlled rectifier over a half cycle.

References Cited in the file of this patent

UNITED STATES PATENTS

| | | |
|---|---|---|
| 2,310,101 | Lord | Feb. 2, 1943 |
| 2,490,562 | Van Dorsten | Dec. 6, 1949 |
| 2,880,374 | Mulder | Mar. 31, 1959 |
| 2,920,240 | Macklem | Jan. 5, 1960 |
| 2,924,750 | Mulder | Feb. 9, 1960 |

Notice of Adverse Decision in Interference

In Interference No. 93,578 involving Patent No. 3,061,744, J. S. Spira, ELECTRIC RECTIFYING POWER CONTROL AND LAMP DIMMING SYSTEM, final judgment adverse to the patentee was rendered Feb. 14, 1966, as to claims 1, 2, 3, 4, 5 and 12.

[*Official Gazette June 28, 1966.*]

Notice of Adverse Decision in Interference

In Interference No. 93,578 involving Patent No. 3,061,744, J. S. Spira, ELECTRIC RECTIFYING POWER CONTROL AND LAMP DIMMING SYSTEM, final judgment adverse to the patentee was rendered Feb. 14, 1966, as to claims 1, 2, 3, 4, 5 and 12.

[*Official Gazette June 28, 1966.*]